United States Patent
Barr et al.

[11] 3,838,534
[45] Oct. 1, 1974

[54] FISH TRANSFER SYSTEM

[75] Inventors: Leslie A. Barr, San Diego; Hector Sanchez, La Mesa, both of Calif.

[73] Assignee: Sea Research Corporation, San Diego, Calif.

[22] Filed: Sept. 7, 1971

[21] Appl. No.: 178,127

[52] U.S. Cl. .................................. 43/6.5
[51] Int. Cl. ............................... A01k 79/00
[58] Field of Search ..................... 43/6.5; 302/14

[56] References Cited
UNITED STATES PATENTS

| | | | |
|---|---|---|---|
| 1,606,668 | 11/1926 | Rubach | 43/6.5 |
| 2,512,194 | 6/1950 | Asaro et al. | 302/14 |
| 2,861,841 | 11/1958 | Pengra | 302/14 |
| 3,514,811 | 6/1970 | West | 302/14 |

Primary Examiner—Warner H. Camp
Attorney, Agent, or Firm—Richard K. MacNeill

[57] ABSTRACT

A fish transfer system installed in a fishing boat in which a fish conveyor mechanism is lowered into a fishing net after a catch is secured therein having a pump for creating current into the entrance of the fish conveyor which can have an elongated oval shaped entrance for orienting the larger fish as they approach the entrance with a conveying means inside the conveyor for elevating all fish over the side of the ship and into a fish well disposed therein.

3 Claims, 6 Drawing Figures

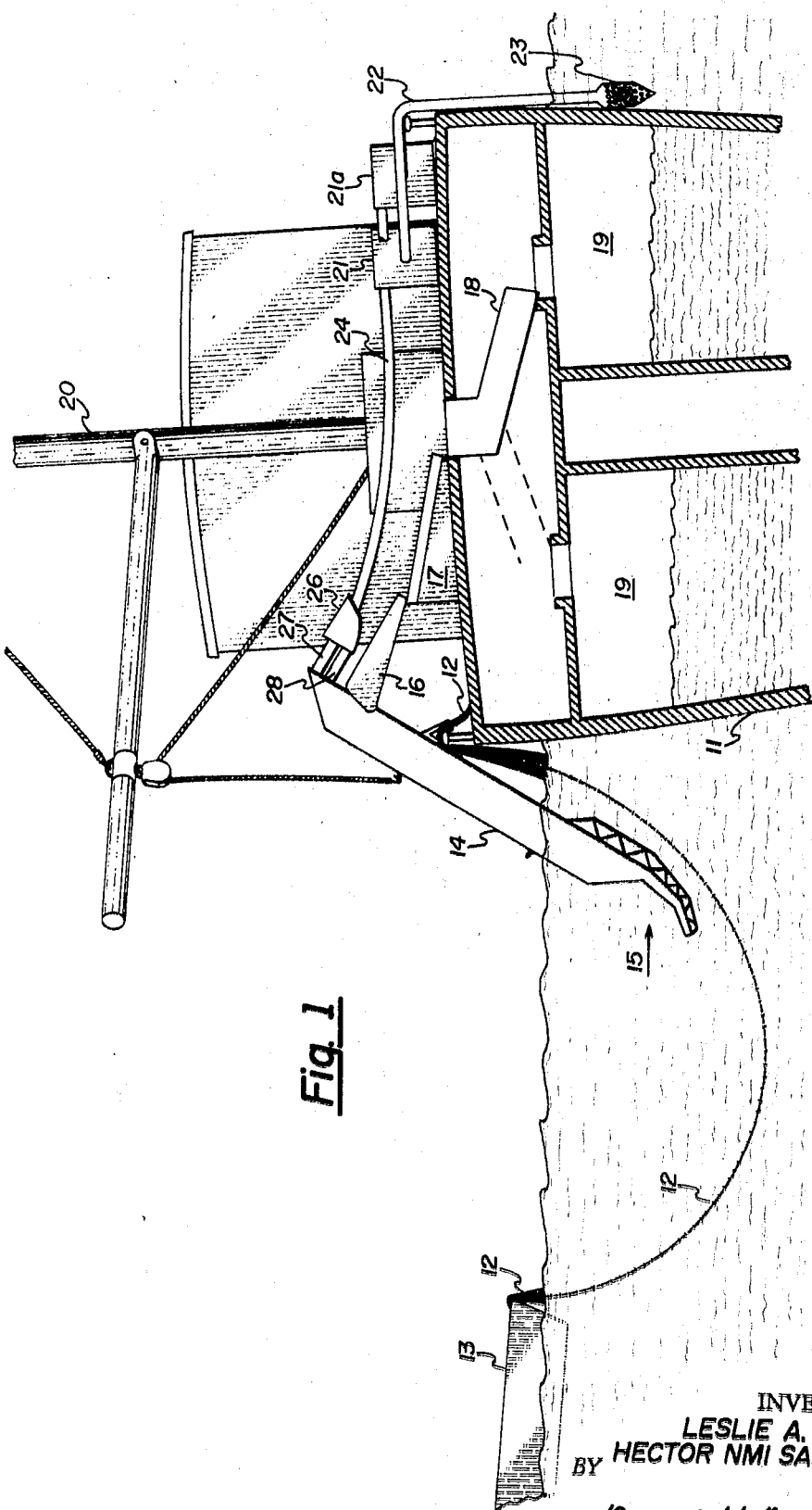

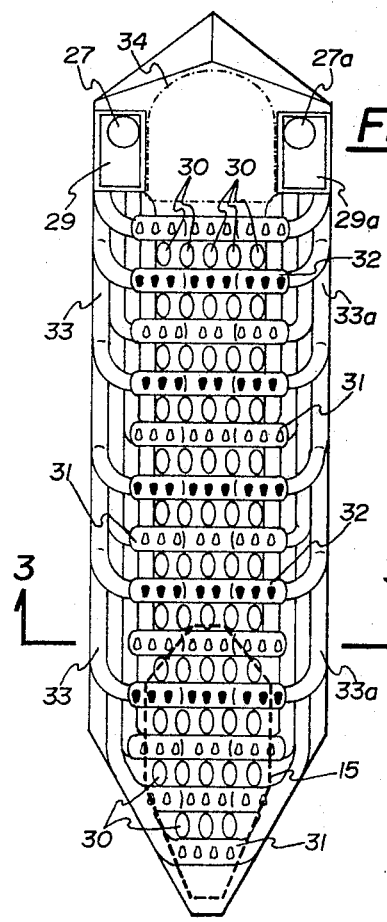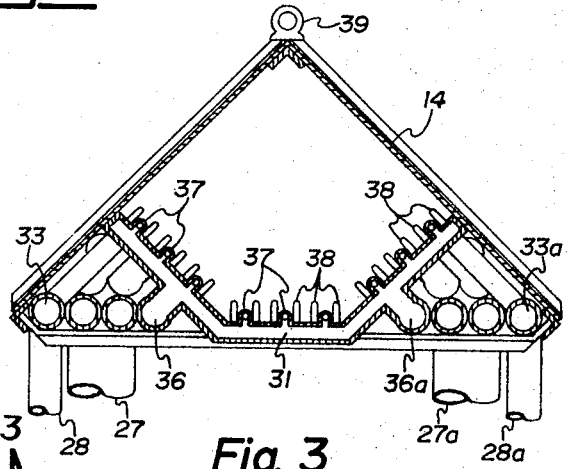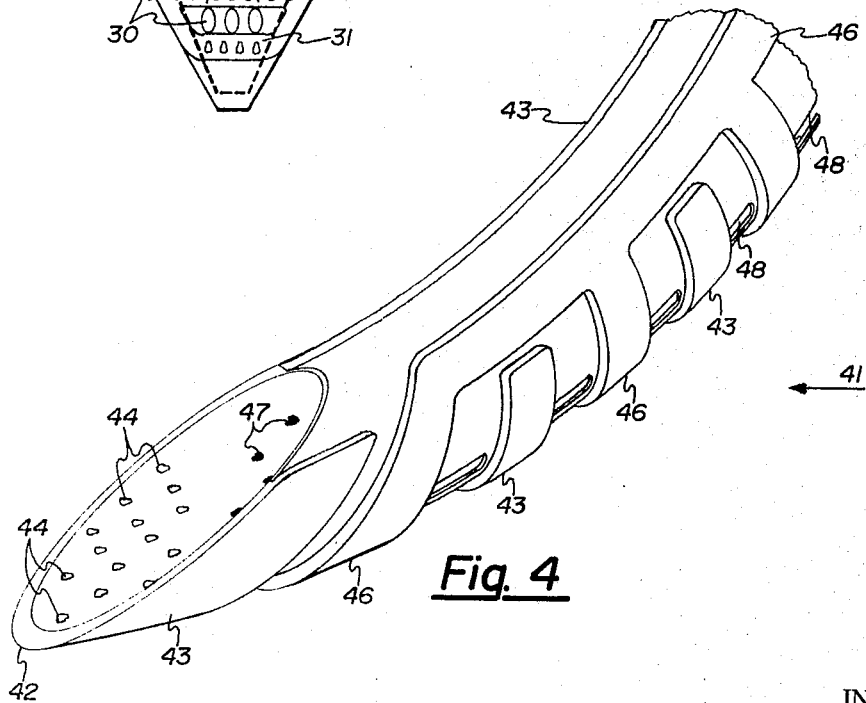

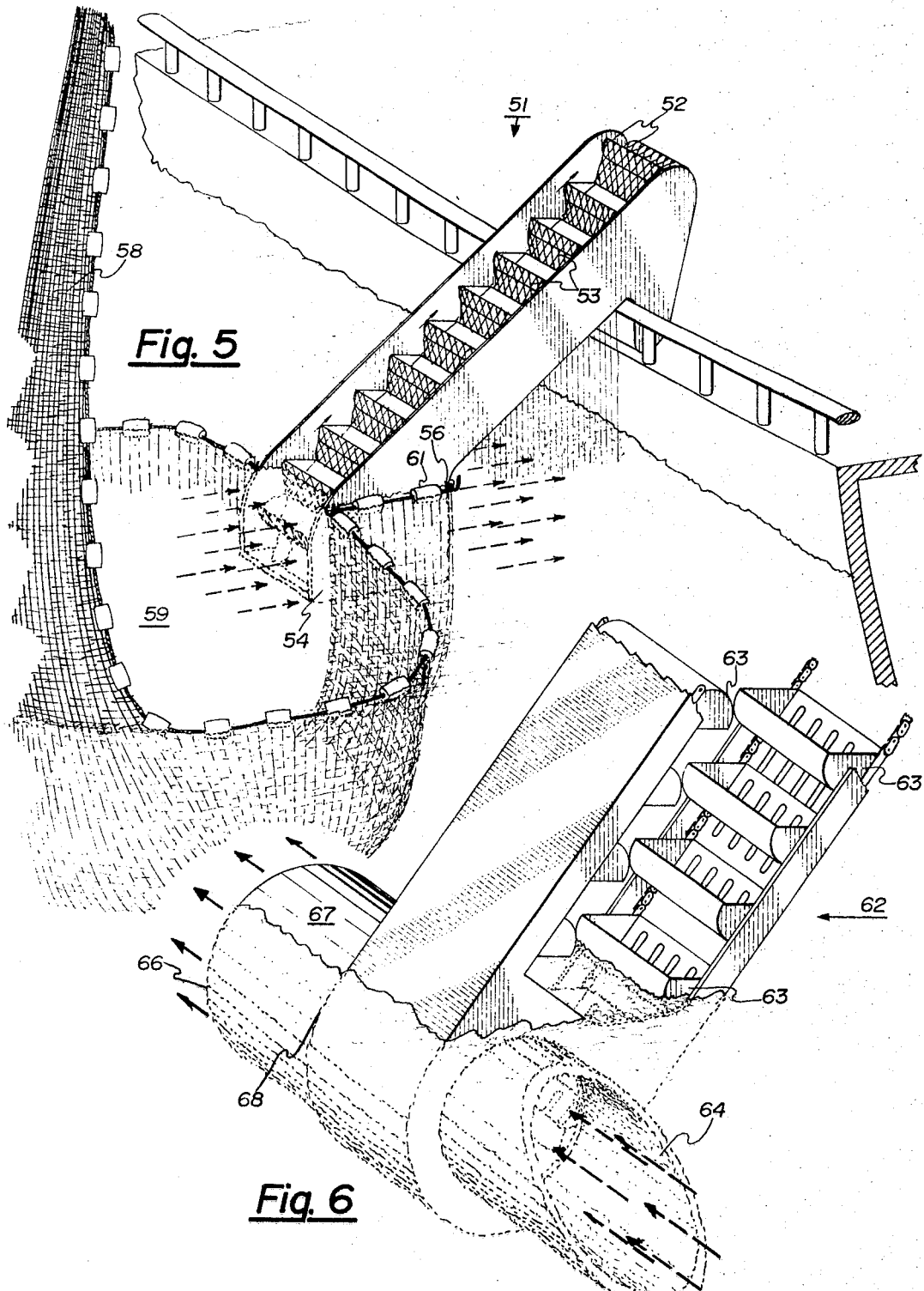

FISH TRANSFER SYSTEM

BRIEF DESCRIPTION OF THE INVENTION

The present invention relates to a fish transfer system and more particularly to a fish transfer system which creates a water current for pulling fish into the entrance of a conveying system.

According to the invention, a fish transfer system is provided which includes a reversible conveying mechanism disposed into a loaded fish net for bringing the fish on board the fishing boat. The conveying mechanism includes a water current producing means for drawing the fish into the entrance of the conveyor and an entrance which is preferably an oblique oval shape to aid in fish entry and orientation. The conveying mechanism itself is preferably a plurality of water jets drawing the fish into the entrance and lifting the fish up through the conveyor and into the fish well on the boat. A secondary system would involve drawing the fish into the entrance of a conventional escalator type of fish ladder for escalating the fish onto the boat.

An object of the present invention is the provision of an improved fish transfer system.

A further object of the invention is the provision of a fish transfer system for rapidly loading or unloading a catch of fresh or frozen fish by a fishing boat.

A still further object of the invention is the provision of a fish transfer system which does a minimum of damage to the fish being transferred.

A still further object of the invention is the provision of a fish transfer system having excellent fish attraction and fish orientation characteristics.

Yet another object of the invention is the provision of a fish transfer system which is relatively simple to manufacture, install and operate.

Other objects and many of the attendant advantages will be readily appreciated as the same becomes better understood by reference to the following detailed description when considered in connection with the accompanying drawings in which like reference numerals designate like parts throughout the figures thereof and wherein:

FIG. 1 is a schematic representation of the preferred embodiment of the invention in situ;

FIG. 2 is a sectional view of the preferred transfer mechanism of the present invention;

FIG. 3 is a sectional view taken along lines 3—3 of FIG. 2;

FIG. 4 illustrates an alternative transfer mechanism in perspective;

FIG. 5 illustrates a second alternative transfer mechanism in situ; and

FIG. 6 illustrates a third alternative transfer mechanism in perspective.

DETAILED DESCRIPTION OF THE DRAWINGS

Referring to FIG. 1, a fishing boat is shown schematically at 11 in proximity to a fishing net 12 which is tied between a net skiff 13 and a conveying mechanism 14. Conveying mechanism 14 has an intake 15 with an exhaust shoot 16 which feeds a hopper 17. Hopper 17 feeds flume 18 which communicates with fish well 19.

Pumps 21 and 21A are parallelly connected having intake line 22. Intake line 22 communicates with an intake filter 23 disposed beneath the surface of the water. Pump 21 has an exhaust line 24 coupled to control valve 26 which has two output lines, namely, a forward loading water line output 27 and a reverse water line output 28. Pump 21A is similarly connected with an exhaust line (not shown) and a control valve (not shown). A boom, shown generally at 20, is coupled to the conveying mechanism 14 for hoisting.

Referring to FIG. 2, a sectional view of the preferred embodiment of conveying mechanism 14 has an elongated port 15 shown in dotted lines. Loading water lines 27 and 27A are shown communicating with loading manifolds 29 and 29A. Loading manifolds 29 and 29A have output lines communicating with lift nozzle manifolds 31. Reverse nozzle manifolds 32 communicate with reverse manifold tubes 33 and 33A. The fish outlet is shown at 34 along drain ports 30.

Referring to FIG. 3, an end view of the conveyor mechanism shown generally at 14 with loading water lines 27 and 27A are communicating with lines 36 and 36A which in turn communicate with lift nozzle manifold 31. Lift nozzle manifold 31 has a plurality of nozzles 37. Reverse manifold tubes 33 and 33A are shown at the outside corners of the mechanism and communicating with reverse water line 28 and 28A. A lift hook 39 is shown at one edge of the mechanism. Fish skids 38 running the entire length of conveying mechanism 14 serve three purposes. They minimize friction of loading fish, provide drainage channels for the water, and house the nozzles.

Referring to FIG. 4, a modification of the conveying mechanism is shown at 41. Here, lift manifold line 43 communicates with lifting nozzles 44 while reverse manifold 46 communicates with reverse nozzles 47. Drain ports 48 are disposed on the lower surface of the transfer mechanism. The input 42 of mechanism 41 is shown having an elongated oblique geometry.

Referring to FIG. 5, a modification of the transfer mechanism is shown at 51 containing an escalator 52. Draining bucket steps with mesh sections 53 are disposed between the individual steps contain the fish during the transfer cycle. Intake 54 communication with a pump (not shown) which in turn communicates with an exhaust at plain 56. Fish net 58 is carried by buoy line 61 and attached thereby to the conveying mechanism 51.

Referring to FIG. 6, a further modification of the conveying mechanism shown at 62 with an inside bucket conveyor 63. Intake 64 communicates with a pump housing 67 which has a mesh plain 68 at which point a mesh (not shown) is disposed for stopping the fish from entering the pump. Pump 67 has an exhaust 66.

OPERATION

Referring back to FIGS. 1, 2 and 3, the operation of the preferred embodiment will be described. The lifting nozzle manifolds pointing away from and in proximity to the entrance 15 by means of the momentum transfer principle, create a water current flowing into the entrance which draws the fish within net 12 along with it and tends to orient the fish toward the opening 15. The opening 15 is shown having an elongated oblique geometry which has been found emperically to aid in orientation of large fish since the confinement is minimal as the fish approach the entrance. The direction of the opening is not critical and can be rotated or swivelled to aid in drawing fish. Once the fish has been drawn into the entrance, the lift nozzles in the lift manifolds push the fish from one manifold to the next until the fish reach the outlet 34 at top of the transfer mechanism. This system of lifting the fish does not require a total water lift since the water emerging from each nozzle needs to lift fish only a minimum distance i.e. to the next manifold. When the fish exits through outlet 34 it slides down shoot 16, hopper 17 and flume 18 into refrigerated well 19. The nozzles are selected so that the fish are not damaged by the emerging water.

Pumps 21 and 21A are completely parallel in operation and, depending upon the size and capacity of the pumps, the two may not be necessary in which case one would serve as a back up for the other. Should it be necessary to reverse the jets, the valve 26 throws reverse water line 28 in communication with pumps 21 and 21A, at which time water pressure is applied to reverse nozzle manifolds 32 through reverse manifold tubes 33. Since the water direction is reversed, the fish will then be flushed through the conveying mechanism back into the water. This is necessary should a fish become wedged and can be utilized for unloading. Fish skids 38 are dimensioned for spacing the fish away from the nozzles themselves and providing a path of minimum friction for the fish to follow, as well as convenient water draining channels.

The fish conveying mechanism can be fabricated to a cross-sectional dimension suitable to accommodate the diameter of the largest fish being transferred where fish orientation opening 15 is utilized. Orientation is not required if the length of the largest fish is equal to or less than the diameter of the conveyor mechanism fish entrance. It is further understood that said system can be fabricated to any length, and can be sufficiently flexible to accommodate any vertical or horizontal distance or direction, such as multiple curves or 90° bends.

The quantity and location of the lift and reverse nozzle configuration shown in FIG. 3 relates only to the preferred embodiment and can be altered and optimized for specified transfer mechanism design and applications influenced by size of fish, desired fish transfer rates, and elevating distance. The water high pressure propelling mechanism can be powered by any suitable combustion, electric, or hydraulic motor.

The water or fluid for the propelling mechanism can be of any suitable filtered source supplied either externally or obtained local to the fish. For example, pump 21A could be of a submerged type mounted behind the entrance to the conveyor mechanism where high pressure water for the nozzles is obtained local to the fish, or line 22 and filter 23 supplying water to pump 21A could be inserted into the netted fish to obtain water local to the fish. This same filter and line could be inserted into the cold brine of the fish well on the boat to maintain refrigeration while unloading fish wells at the dock or during ship to ship transfer in the harbor or at sea.

It should also be understood that various degrees of drainage restriction through fish skids 38 creates corresponding heights of the water column within conveyor mechanism 14, including that condition at total closure where the entire water column containing fish is lifted to the deck level of the boat and the water can subsequently be drained from the fish through, say, exhaust shoot 16, prior to the fish entering hopper 17. Of course, lifting the column of water to the deck of the boat requires more lifting energy than the procedure of releasing the water at the surface of the sea.

In the preferred embodiment of FIG. 1, water that drains from the fish by means of fish skids 38 is free to fall to the surface of the sea. However, this water can be channeled by means of a back plate (not shown) and routed to any desired location. The back plate can also be used in a closed system where all water is contained or returned to the fishing well, such as during fish unloading operations.

The preferred embodiment of FIGS. 1, 2 and 3 is selected to depict a netted fish loading concept to minimize installation and fishing boat modification requirements. Other embodiments can readily be appreciated, particularly where the entire transfer mechanism becomes an integral part of the fishing boat or the skiff.

It is also understood that the mechanism can be used to rapidly transfer compacted fresh or frozen fish from a fish well aboard a fishing boat to another boat at dock or cannery, and that pressurized water nozzles located within the lip of the fish entrance can be directed away from said entrance in a manner to create stirring forces locally to the densely compacted fish to dislodge and stir the fish into free water suspension where they are subsequently drawn into the fish entrance for transfer.

Referring to FIG. 4, an alternate construction is shown of the main-folding of the water supply to the lift and reverse nozzles.

Referring to FIG. 5, an escalator type of conveyor is shown at 51 in which a pump within pump area 57 creates current drawing fish onto steps into the draining buckets of escalator 52 for escalation onto the deck of the boat.

Referring to FIG. 6, the same elongated oblique intake of the preferred embodiment is shown at 64 for fish orientation and minimal jamming. Here, the pump is located in pump housing 67 which creates a water current drawing fish into the conveying mechanism where buckets 63 carry the fish onto the boat.

It should be understood, of course, that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:
1. A fish transfer system comprising:
   a fish conveying mechanism operable for conveying fish from a first location to a second location;
   a fish entrance to said fish conveying mechanism;
   a plurality of pressurized water nozzles disposed in immediate proximity to said entrance operable for pulling fish into said fish entrance; and
   a plurality of fish skids in said conveying mechanism dimensioned for housing said plurality of said nozzles.
2. A fish transfer system comprising:
   a fish conveying mechanism operable for conveying fish from a first location to a second location;
   a fish entrance to said fish conveying mechanism, said fish entrance to said fish conveying mechanism being at least partially submerged in fish containing water and including an elongated oblique inlet larger in surface area than the cross-sectional area of said fish conveying mechanism; and a plurality of pressurized water nozzles disposed in immediate proximity to said entrance operable for pulling fish into said fish entrance.

3. A fish transfer system comprising:

a fish conveying mechanism operable for conveying fish from a first location to a second location;

a fish entrance to said fish conveying mechanism, said fish entrance to said fish conveying mechanism being at least partially submerged in fish containing water, said fish entrance including an oblique oval shaped inlet for orienting incoming fish; and a plurality of pressurized water nozzles disposed in immediate proximity to said entrance operable for pulling fish into said fish entrance.

* * * * *